(12) United States Patent
Zmijewski et al.

(10) Patent No.: US 12,316,646 B2
(45) Date of Patent: May 27, 2025

(54) TRUSTED PROFILE OF A DEVELOPER AND DEVELOPMENT ENVIRONMENT TO PROTECT SOFTWARE SUPPLY CHAIN

(71) Applicant: Intel Corporation, Santa Clara, CA (US)

(72) Inventors: Piotr Zmijewski, Gdańsk (PL); Arkadiusz Berent, Tuchom (PL); Mateusz Bronk, Gdańsk (PL)

(73) Assignee: INTEL CORPORATION, Santa Clara, CA (US)

( * ) Notice: Subject to any disclaimer, the term of this patent is extended or adjusted under 35 U.S.C. 154(b) by 281 days.

(21) Appl. No.: 17/693,070

(22) Filed: Mar. 11, 2022

(65) Prior Publication Data

US 2022/0201007 A1 Jun. 23, 2022

(51) Int. Cl.
H04L 9/40 (2022.01)
(52) U.S. Cl.
CPC ........ H04L 63/126 (2013.01); H04L 63/0884 (2013.01)
(58) Field of Classification Search
CPC . H04L 63/126; H04L 63/0884; H04L 63/102; H04L 63/0876; H04W 12/71
See application file for complete search history.

(56) References Cited

U.S. PATENT DOCUMENTS

| 9,426,139 B1* | 8/2016 | McClintock | G06F 21/40 |
| 2015/0199188 A1* | 7/2015 | Mantripragada | G06F 21/121 717/101 |
| 2016/0055327 A1* | 2/2016 | Moran | G06F 21/32 726/19 |

\* cited by examiner

Primary Examiner — Amie C. Lin
(74) Attorney, Agent, or Firm — JAFFERY WATSON HAMILTON & DESANCTIS LLP

(57) ABSTRACT

A system and method of authenticating a development environment include receiving, by one or more processors associated with a source code repository, a development profile from a development environment. Sending the development profile to a trusted profile verifier to be registered as a trusted development profile. Receiving a pending source file commit request, where the pending source file commit request includes source code files and a current development profile. Facilitating verification of whether the current development profile matches the trusted development profile. When it is verified that the current development profile matches the trusted development profile, accepting the source code files.

17 Claims, 7 Drawing Sheets

TRUSTED PROFILE OF A DEVELOPER AND DEVELOPMENT ENVIRONMENT TO PROTECT SOFTWARE SUPPLY CHAIN

FIELD

Embodiments relate generally to computer security, and more particularly, to a trusted development profile that is verified while accepting source files at a source code repository in computing systems.

BACKGROUND

A typical software supply chain starts with developers producing source code in their development environment. The source code may be committed to a shared, remote source code repository. The build process ingests the source code from the source code repository to produce software artifacts. The software supply chain may be compromised at the development environment by various means including stealing credentials and impersonating the developer of the source code. In this regard, malicious source code can be injected into the source code repository by the attacker, effectively poisoning software artifacts delivered in the software supply chain. Current authentication mechanisms (e.g., authorizing a set of credentials) do not provide sufficient protection against attacks on the development environment.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope. The figures are not to scale. In general, the same reference numbers will be used throughout the drawings and accompanying written description to refer to the same or like parts.

DETAILED DESCRIPTION

Figure 1:
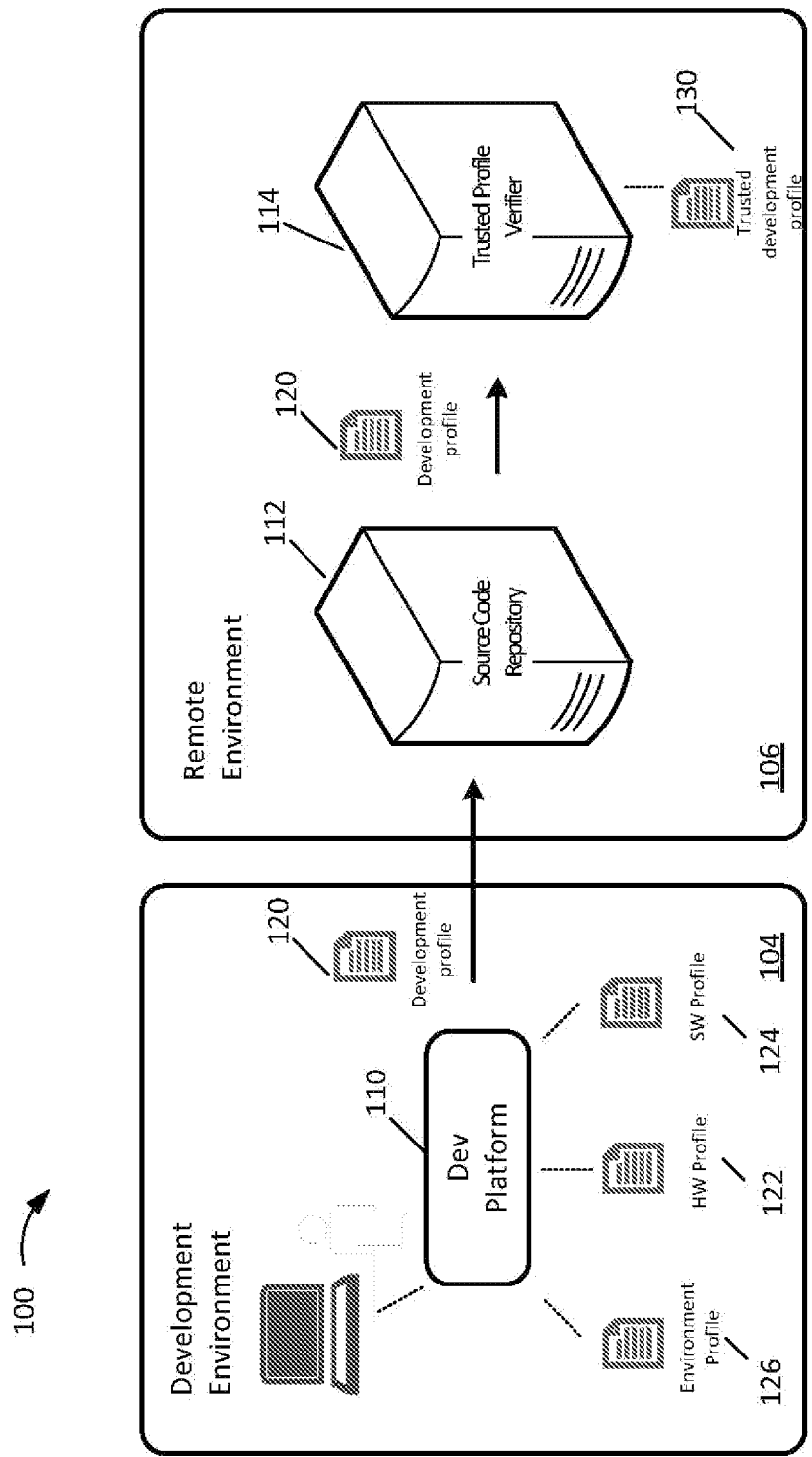
FIG. 1 is a diagram of an exemplary authentication system for registering a trusted development profile according to some embodiments.

Implementations of the technology described herein provide a method and system for producing a trusted development profile that is used to authenticate a development environment while receiving source code at a remote source code repository. Unauthorized development platforms and/or developers attempting to submit malicious source code to the source code repository may be detected and the attempt may be rejected.

Typically, a set of credentials (e.g., user/password) or a stronger, multi-factor authentication mechanism (e.g., smartphone, hardware (HW) token, fingerprint, iris scan) are used to authenticate and authorize a developer submitting source code files to a source code repository. Attacks to the development environment may include stealing credentials (e.g., user/password), remotely injecting source code to files stored on a local drive, installing malware capable of modifying files, evil maid attacks, and the like. As such, current authentication techniques do not provide robust protection against attacks to the software supply chain.

The technology described herein provides a trusted development profile of a developer and a developer work environment for facilitating robust protection of the software supply chain. Embodiments may be employed for registering a trusted development profile. The trusted development profile may include a HW profile, a software (SW) profile and an environment profile. Embodiments may associate a trusted development profile to each development environment. The development environment may include a developer and a developer platform (e.g., the HW and SW of a computing device used by the developer). In this regard, a trusted development profile may be created for each developer and developer platform/work environment. Embodiments may receive the trusted development profile by a source code repository. For example, the trusted development profile may be created by the developer work environment/platform and sent to a remote source code repository. Embodiments may send the trusted development profile to a trusted profile verifier to be registered as a trusted development profile. In some implementations, the trusted profile verifier may register the trusted development profile by verifying the HW and SW attestation evidence included in the trusted development profile.

Embodiments may be employed for verifying a current development profile. The current development profile may include a HW profile, a SW profile, and an environment profile. Embodiments may create a current development profile each time source code files are submitted to the source code repository. For example, a current development profile may be created by the developer work environment/platform and submitted to the remote source code repository with each submission of source code files. Embodiments may facilitate verification of whether the current development profile matches the trusted development profile that is previously registered by the trusted profile verifier before accepting the source code files.

Embodiments may facilitate verification by sending the current development profile to the trusted profile verifier for verification. For example, the trusted profile verifier may compare the current development profile to the trusted development profile. In some implementations, the trusted profile verifier may compare the HW and SW attestation measurements in the current development profile to the HW and SW attestation measurements in the trusted development profile to verify an exact match. In some implementations, the trusted profile verifier may implement machine learning techniques to compare environment data in the current development profile to environment data in the trusted development profile to verify a match. The environment data may include environment characteristics such as keyboard usage statistics, mouse usage statistics, camera video frames, lighting conditions, geolocation data, surrounding sounds, noise levels, and the like. When the current development profile is authenticated as trustworthy, an authentication response indicating trust may be sent to the source code repository. In response, the source code repository may accept the source code files submitted with the verified current development profile. In this regard, attacks on the software supply chain from malicious actors injecting and/or modifying source code files are prevented.

FIG. 1 is a diagram of one aspect of an authentication system 100 for registering a trusted development profile. The authentication system 100 may include a development environment 104 and a remote environment 106. In aspects, the authentication system 100 may be implemented in the development environment 104. The development environment 104 is where a development profile is created for authenticating the development environment 104 described herein. The development environment 104 may include a development platform 110, a development profile 120, a HW profile 122, a SW profile 124, and an environment profile 126. In one example, the development profile 120 comprises the HW profile 122, the SW profile 124, and the environment profile 126. The development platform 110 may have a user/developer associated with it. For example, a developer may use the development platform 110 to create source code and/or source code files. In one example, the development platform 110 may include a client computing device. In a basic configuration, the client computing device is a handheld computer having both input elements and output elements. The client computing device may be any suitable computing device for implementing the authentication system 100 for registering a trusted development profile. For example, the client computing device may be at least one of: a mobile telephone; a smart phone; a tablet; a phablet; a smart watch; a wearable computer; a personal computer; a desktop computer; a laptop computer; a gaming device/computer; etc. This list is exemplary only and should not be considered as limiting. Any suitable client computing device for implementing the authentication system 100 for registering a trusted development profile may be utilized.

In examples, the development profile 120 is created using data from the development environment 104. For example, the development profile 120 may be created for a developer and his/her work environment. The developer work environment may include the development platform 110 and characteristics of the development environment 104. The development platform 110 may include a HW platform used for development. In one example, the HW platform and its peripheral devices may be attested using Security Protocol and Data Model (SPDM). In this regard, the HW profile 122 may include authenticated measurements of HW ingredients of the development platform 110. In one example, the authenticated measurements are in the form of attestation evidence/quotes that can be verified by appropriate attestation verifiers.

In other examples, the development platform 110 may include a SW stack used for development. In one implementation, the SW stack may be measured and attested using Trusted Platform Module (TPM) (e.g., during boot). In another implementation, the SW stack may be executed in an attestable Trusted Execution Environment (TEE) (e.g., Software Guard Extensions (SGX), Trust Domain Extensions (TDX)). In this regard, the SW profile 124 may include authenticated measurements of the SW stack of the development platform 110. In one example, the authenticated measurements are in the form of attestation evidence/quotes that can be verified by appropriate attestation verifiers.

As discussed above, the development profile 120 may include characteristics of the development environment 104. As such, the development platform 110 may gather environmental characteristics associated with the development platform 110. The environmental characteristics may include one or more of keyboard usage statistics, mouse usage statistics, camera video frames, lighting conditions, geolocation data, surrounding sounds and noise levels. In this regard, the environment profile 126 may include the environmental characteristics associated with the development platform 110 and/or the development environment 104. In aspects, the development platform 110 may create the HW profile 122, the SW profile 124, and the environment profile 126 during a developer account registration. The development platform 110 may produce and digitally sign the development profile 120 to include the HW profile 122, the SW profile 124, and the environment profile 126.

In aspects, the authentication system 100 may be implemented in the remote environment 106. In one example, the remote environment 106 may include a web service that provides a remote source code repository such as GitHub and the like. The remote environment 106 may provide data to and from the development environment 104 through a network, for example. In aspects, the authentication system 100 may be implemented on more than one remote environment 106, such as a plurality of remote environments 106. As discussed above, the remote environment 106 may provide data to and from the development environment 104 through a network. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. In another aspect, the authentication system 100 may be implemented as a web-based application. In one example, the web-based application may include any client-server software application where the client (e.g., user interface) runs in a web-browser and/or any component capable of rendering HTML, Flash, Silverlight, and the like.

As illustrated in FIG. 1, the remote environment 106 may include a source code repository 112, a trusted profile verifier 114, the development profile 120, and a trusted development profile 130. In examples, the source code repository 112 may include source code repositories such as Team Foundation Server (TFS), GitHub, Source Depot, and the like. As such, source code written using the development platform 110 may be uploaded to the source code repository 112. The source code repository 112 may be configured to archive the source code. In one implementation, the source code repository 112 may be configured to register the development profile 120. As such, the development profile 120 may be uploaded/sent to the source code repository 112 from the development platform 110.

In aspects, the source code repository 112 may register the development profile 120 by sending the development profile 120 to the trusted profile verifier 114. In this regard, the trusted profile verifier 114 may be configured to verify the attestation evidence/measurements in the HW profile 122 and the SW profile 124 of the development profile 120. In one example, the trusted profile verifier 114 may verify the attestation evidence/measurements by verifying the measurements came from a development platform 110 that has not been revoked. When the attestation evidence/measurements are verified the development profile 120 may be registered as the trusted development profile 130.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the technology may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 2:
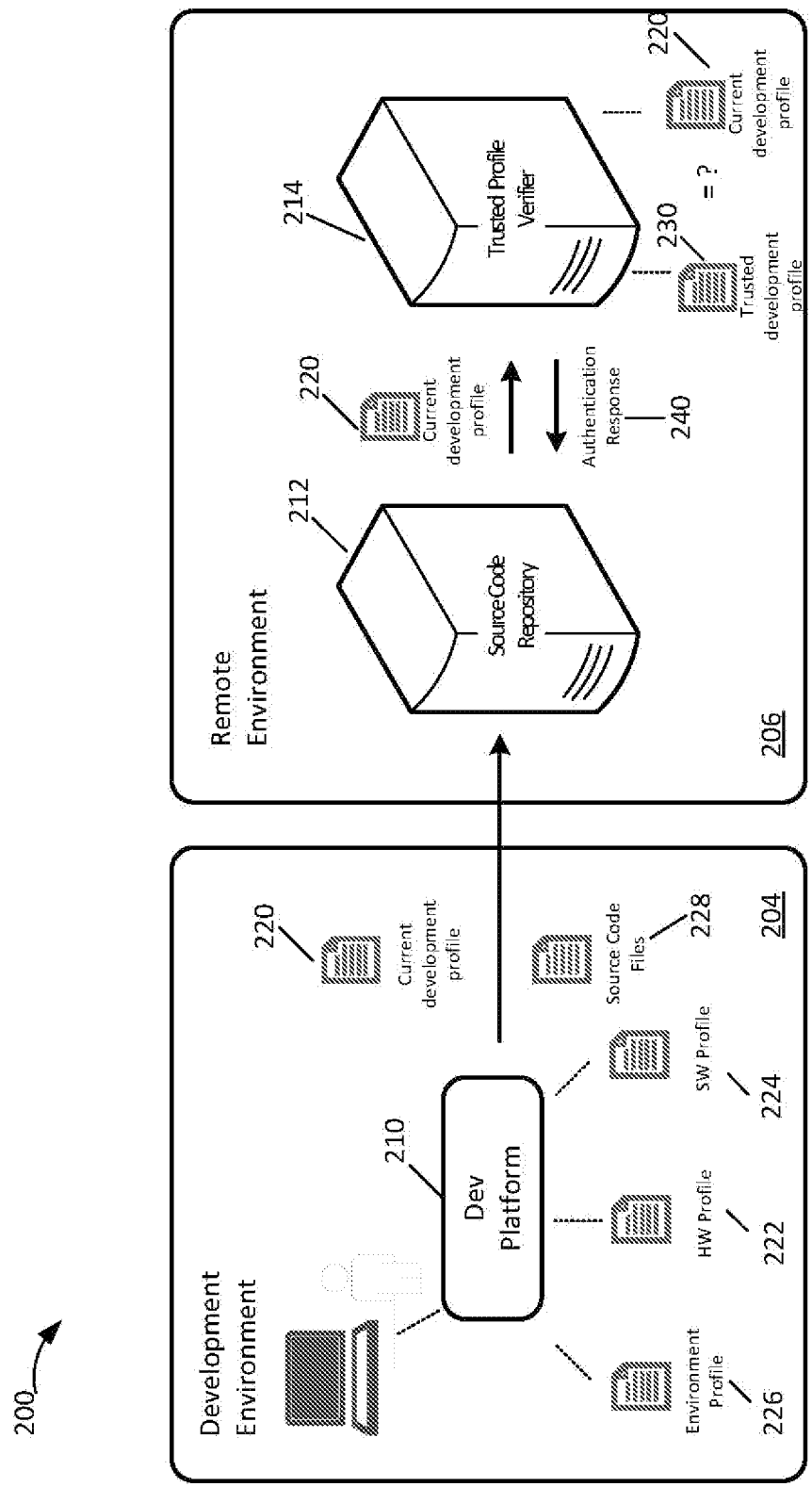
FIG. 2 is a diagram of an exemplary authentication system for verifying a current development profile according to some embodiments.

FIG. 2 is a diagram of one aspect of an authentication system 200 for verifying a current development profile. The authentication system 200 may include a development environment 204 and a remote environment 206. In aspects, the authentication system 200 may be implemented in the development environment 204. The development environment 204 is where a development profile is created for authenticating the development environment 204 described herein. The development environment 204 may include a development platform 210, a current development profile 220, a HW profile 222, a SW profile 224, an environment profile 226, and source code files 228. In one example, the current development profile 220 comprises the HW profile 222, the SW profile 224, and the environment profile 226 The development platform 210 may have a user/developer associated with it. For example, a developer may use the development platform 210 to create source code and/or the source code files 228. In one example, the development platform 210 may include a client computing device. In a basic configuration, the client computing device is a handheld computer having both input elements and output elements. The client computing device may be any suitable computing device for implementing the authentication system 200 for verifying a current development profile. For example, the client computing device may be at least one of: a mobile telephone; a smart phone; a tablet; a phablet; a smart watch; a wearable computer; a personal computer; a desktop computer; a laptop computer; a gaming device/computer; etc. This list is exemplary only and should not be considered as limiting. Any suitable client computing device for implementing the authentication system 200 for verifying a current development profile may be utilized.

In examples, the current development profile 220 is created using data from the development environment 204. For example, the current development profile 220 may be created for a developer and her work environment. The developer work environment may include the development platform 210 and characteristics of the development environment 204. The development platform 210 may include a HW platform used for development. In one example, the HW platform and its peripheral devices may be attested using Security Protocol and Data Model (SPDM). In this regard, the HW profile 222 may include authenticated measurements of HW ingredients of the development platform 210. In one example, the authenticated measurements are in the form of attestation evidence/quotes that can be verified by appropriate attestation verifiers.

In other examples, the development platform 210 may include a SW stack used for development. In one implementation, the SW stack may be measured and attested using TPM (e.g., during boot). In another implementation, the SW stack may be executed in an attestable TEE (e.g., SGX, TDX). In this regard, the SW profile 224 may include authenticated measurements of the SW stack of the development platform 210. In one example, the authenticated measurements are in the form of attestation evidence/quotes that can be verified by appropriate attestation verifiers.

As discussed above, the current development profile 220 may include characteristics of the development environment 204. As such, the development platform 210 may gather environmental characteristics associated with the development platform 210. The environmental characteristics may include one or more of keyboard usage statistics, mouse usage statistics, camera video frames, lighting conditions, geolocation data, surrounding sounds and noise levels. In this regard, the environment profile 226 may include the environmental characteristics associated with the development platform 210 and/or the development environment 204. The development platform 210 may produce and digitally sign the current development profile 220 to include the HW profile 222, the SW profile 224, and the environment profile 226.

In aspects, the authentication system 200 may be implemented in the remote environment 206. In one example, the remote environment 206 may include a web service that provides a remote source code repository such as GitHub and the like. The remote environment 206 may provide data to and from the development environment 204 through a network, for example. In aspects, the authentication system 200 may be implemented on more than one remote environment 206, such as a plurality of remote environments 206. As discussed above, the remote environment 206 may provide data to and from the development environment 204 through a network. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. In another aspect, the authentication system 200 may be implemented as a web-based application. In one example, the web-based application may include any client-server software application where the client (e.g., user interface) runs in a web-browser and/or any component capable of rendering HTML, Flash, Silverlight, and the like.

As illustrated in FIG. 2, the remote environment 206 may include a source code repository 212, a trusted profile verifier 214, the current development profile 220, a trusted development profile 230, and an authentication response 240. In examples, the source code repository 212 may include source code repositories such as Team Foundation Server (TFS), GIT, Source Depot, and the like. As such, source code written using the development platform 210 may be uploaded to the source code repository 212. The source code repository 212 may be configured to build and compile the source code into libraries and/or installers.

In embodiments, the development platform 210 may submit a pending source file commit request to the source code repository 212. The pending source file commit request may include the source code files 228 and the current development profile 220. In one example, the current development profile 220 is produced, as described above herein, each time a pending source file commit request including an instance of the source code files 228 is sent to the source code repository 212. In this regard, the source code repository 212 may verify that all instances of the source code files 228 are from a trusted development environment 204 each time they are submitted to the source code repository 212.

In embodiments, the source code repository 212 may receive a pending source file commit request including the source code files 228 and the current development profile 220. The source code repository 212 may be configured to verify whether the current development profile 220 matches the trusted development profile 230. For purposes of illustration, the trusted development profile 230 is the same as the trusted development profile 130 discussed relative to FIG. 1. In this regard, the trusted development profile 230 is registered by the trusted profile verifier 214 according to the processes and technologies for registering a trusted development profile described relative to FIG. 1.

In one implementation, the source code repository 212 may verify that the current development profile 220 matches the trusted development profile 230 by sending the current development profile 220 to the trusted profile verifier 214. The trusted profile verifier 214 may be configured to compare data from the current development profile 220 to data from the trusted development profile 230. For example, the trusted profile verifier 214 may verify the attestation evidence/measurements in the HW profile 222 and the SW profile 224 of the current development profile 220. In one example, the trusted profile verifier 214 may verify the attestation evidence/measurements by verifying the measurements came from a development platform 210 that has not been revoked. In another example, the trusted profile verifier 214 may compare the HW and SW attestation evidence/measurements in the current development profile 220 with the HW and SW attestation evidence/measurements in the trusted development profile 230 to determine whether there is an exact match. When there is an exact match, the trusted profile verifier 214 may verify that the HW profile 222 and the SW profile 224 are trustworthy.

In another example, the trusted profile verifier 214 may compare the environmental characteristics in the current development profile 220 with the environmental characteristics in the trusted development profile 230 by implementing pattern matching using artificial intelligence techniques and/or machine learning algorithms. For example, a different keyboard usage pattern may be detected in the current development profile 220 than the keyboard usage pattern detected in the trusted development profile 230. In this example, a different keyboard usage pattern would indicate that the current development profile 220 does not match the trusted development profile 230. As such, in this example, the source code repository 212 may receive the authentication response 240 from the trusted profile verifier 214 indicating to reject the source code files 228. In another example, when the pattern matching of environmental characteristics meets threshold criteria determined by the artificial intelligence techniques and/or machine learning algorithms, the trusted profile verifier 214 may determine that the current development profile 220 matches the trusted development profile 230. In this example, the source code repository 212 may receive the authentication response 240 from the trusted profile verifier 214 indicating to accept the source code files 228.

Figure 3A:
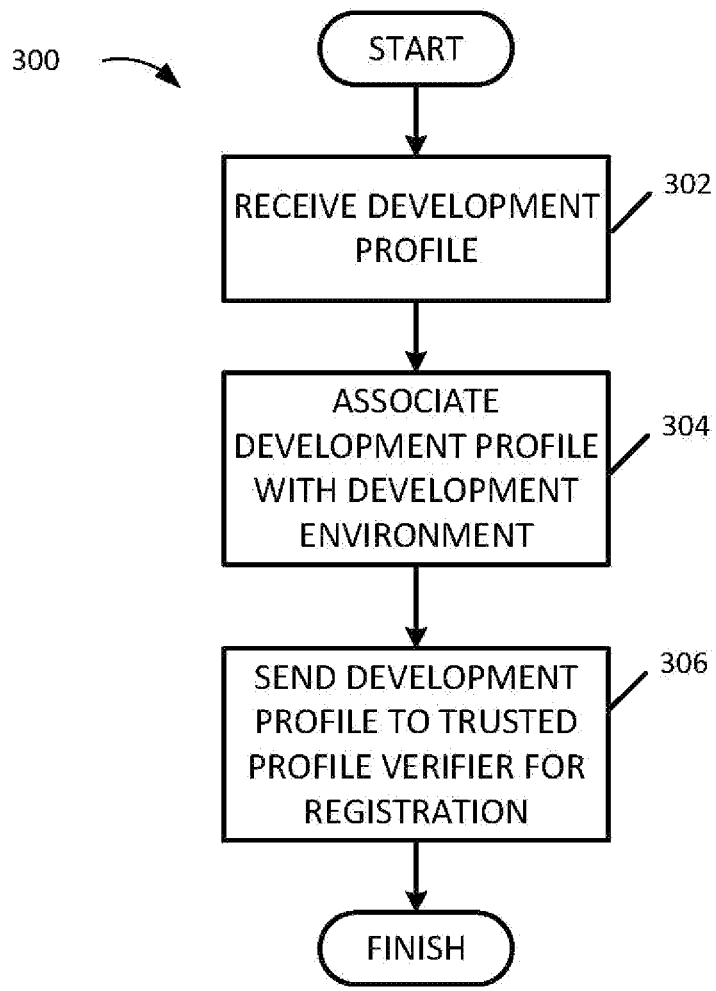
FIG. 3A is a flow diagram of processing registration of a trusted development profile according to some embodiments.

FIG. 3A is a flow diagram of a process 300 for registration of a trusted development profile according to some embodiments. Process 300 may be implemented on a computing device or a similar electronic device capable of executing instructions through at least one processor. Process 300 may begin at operation 302, where one or more processors associated with a source code repository, such as source code repository 112 of FIG. 1, receives a development profile, such as development profile 120 of FIG. 1, from a development environment, such as development environment 104. In one example, the development profile 120 includes at least a hardware profile, such as the hardware profile 122 of FIG. 1, a software profile, such as the software profile 124 of FIG. 1, and an environment profile, such as the environment profile 126 of FIG. 1. In one example, the hardware profile 122 includes authenticated hardware measurements of the development environment 104. In one example, the software profile 124 includes authenticated software measurements of the development environment 104. In one example, the environment profile 126 includes environmental characteristics of the development environment 104. The environmental characteristics may include one or more of keyboard usage statistics, mouse usage statistics, camera video frames, lighting conditions, geolocation data, surrounding sounds and noise levels.

When the source code repository 112 receives the development profile 120 from the development environment 104, flow proceeds to operation 304 where the source code repository 112 associates the development profile 120 with the development environment 104. For example, the development profile 120 is associated with a developer and a development platform, such as the development platform 110 of FIG. 1, of the development environment 104.

When the source code repository 112 associates the development profile 120 with the development environment 104, flow proceeds to operation 306 where the source code repository 112 sends the development profile 120 to a trusted profile verifier, such as the trusted profile verifier 114 of FIG. 1, to be registered as a trusted development profile, such as the trusted development profile 130 of FIG. 1. In one example, the development profile 120 is registered as the trusted development profile 130 by verifying an authenticity of hardware and software attestation evidence.

Figure 3B:
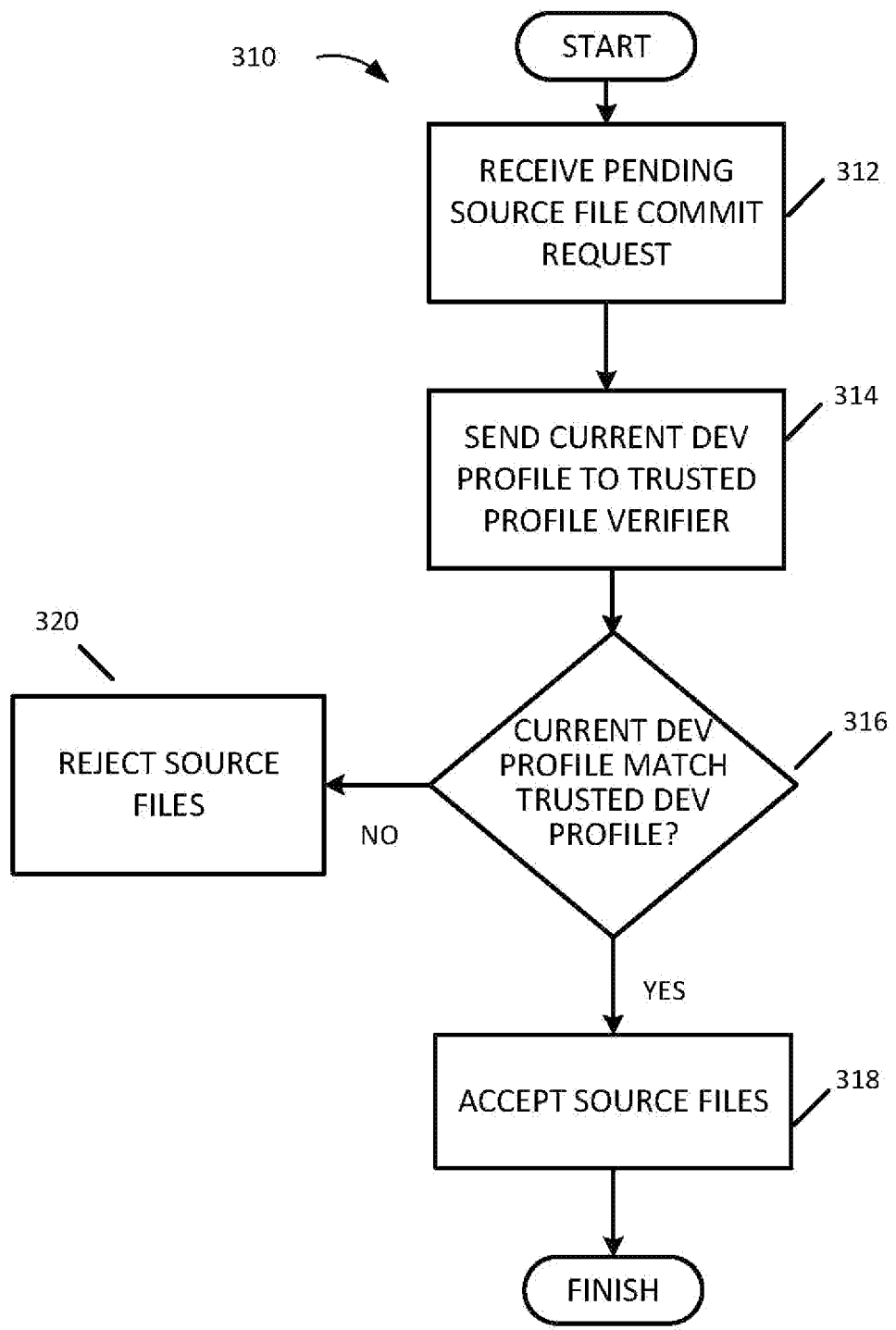
FIG. 3B is a flow diagram of processing verification of a current development profile according to some embodiments.

FIG. 3B is a flow diagram of a process 310 for verification of a current development profile according to some embodiments. Process 310 may be implemented on a computing device or a similar electronic device capable of executing instructions through at least one processor. Process 310 may begin at operation 312, where a source code repository, such as source code repository 212 of FIG. 2, receives a pending source file commit request from a development platform, such as development platform 210 of FIG. 2. In one example, the pending source file commit request includes source code files, such as source code files 228 of FIG. 2, and a current development profile, such as current development profile 220 of FIG. 2.

When the source code repository 212 receives a pending source file commit request from the development platform 210, flow proceeds to operation 314 where the source code repository 212 sends the current development profile 220 to a trusted profile verifier, such as the trusted profile verifier 214 of FIG. 2. In one example, the source code repository 212 sends the current development profile 220 to the trusted profile verifier 214 before the source code repository 212 accepts the source code files 228.

At decision operation 316, a determination of whether the current development profile 220 matches a trusted development profile, such as the trusted development profile 230 of FIG. 2, is facilitated. For example, data from the current development profile 220 may be compared with data from the trusted development profile 230 at the trusted profile verifier 214. In some examples, at least some of the data from the current development profile 220 is compared to at least some of the data from the trusted development profile 230 by implementing at least one of artificial intelligence techniques and machine learning techniques.

When it is determined that the current development profile 220 matches the trusted development profile 230, flow proceeds to operation 318 where the source code repository 212 accepts the source code files 228. When it is determined that the current development profile 220 does not match the trusted development profile 230, flow proceeds to operation 320 where the source code repository 212 rejects the source code files 228.

Figure 4:
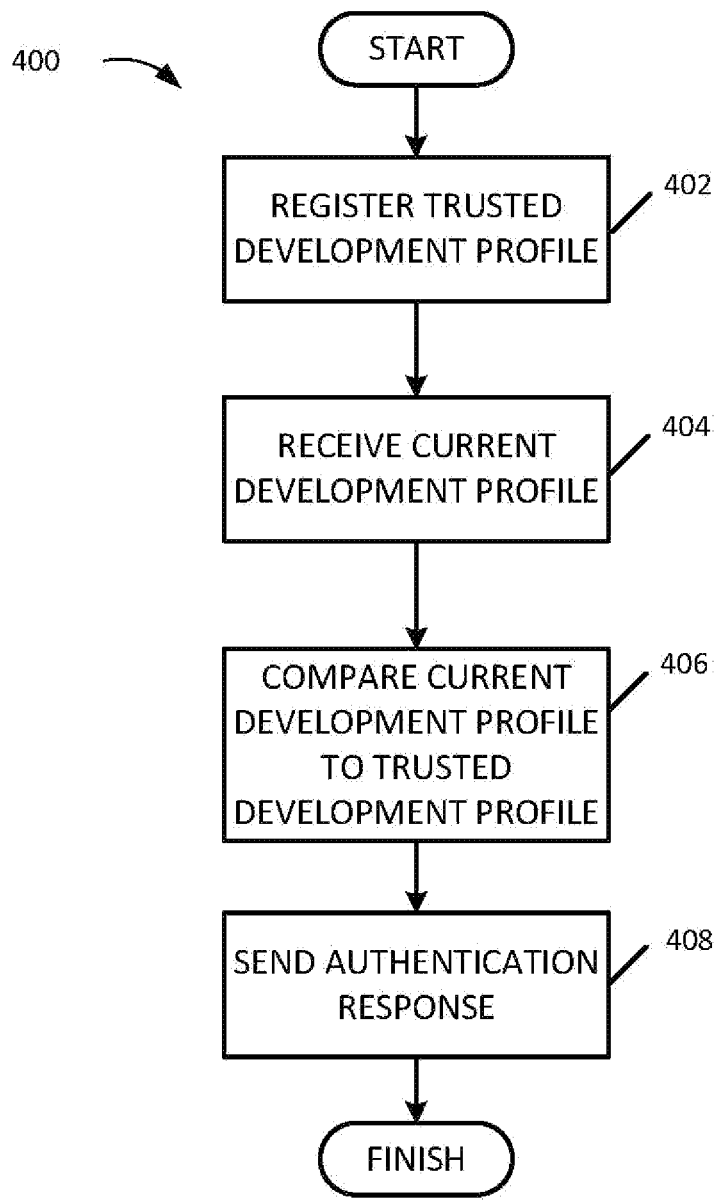
FIG. 4 is a flow diagram of processing verification of a current development profile according to some embodiments.

FIG. 4 is a flow diagram of a process 400 for verification of a current development profile according to some embodiments. Process 400 may be implemented on a computing device or a similar electronic device capable of executing instructions through at least one processor. Process 400 may begin at operation 402, where one or more processors associated with a trusted profile verifier, such as trusted profile verifier 114 of FIG. 1, registers a development profile, such as development profile 120 of FIG. 1, as a trusted development profile, such as trusted development profile 130 of FIG. 1. In one example, registering the development profile 120 as the trusted development profile 130 comprises checking that hardware attestation evidence and software attestation evidence included in the development profile 120 is trustworthy. In one example, checking that hardware attestation evidence and software attestation evidence included in the development profile 120 is trustworthy comprises verifying that hardware attestation evidence and software attestation evidence came from a development platform, such as the development platform 110 of FIG. 1, that has not been revoked.

When one or more processors associated with the trusted profile verifier 114 registers the development profile 120 as the trusted development profile 130, flow proceeds to operation 404 where a current development profile, such as the current development profile 220 of FIG. 2, is received.

When the current development profile 220 is received, flow proceeds to operation 406 where data from the current development profile 220 is compared to data from the trusted development profile 130. In one example, the data from the current development profile 220 and the trusted development profile 130 includes at least hardware and software attestation measurements. In one example, comparing data from the current development profile 220 to data from the trusted development profile 130 comprises comparing the hardware and software attestation measurements in the current development profile 220 with the hardware and software attestation measurements in the trusted development profile 130 to determine whether there is a match. In other examples, data from the current development profile 220 and the trusted development profile 130 includes at least environmental characteristics, and comparing data from the current development profile 220 to data from the trusted development profile 130 comprises comparing the environmental characteristics in the current development profile 220 with the environmental characteristics in the trusted development profile 130.

When data from the current development profile 220 is compared to data from the trusted development profile 130, flow proceeds to operation 408 where an authentication response, such as the authentication response 240 of FIG. 2, is sent to a source code repository, such as source code repository 212 of FIG. 2. In one example, the authentication response 240 indicates whether the current development profile 220 is trustworthy.

Figure 5A:
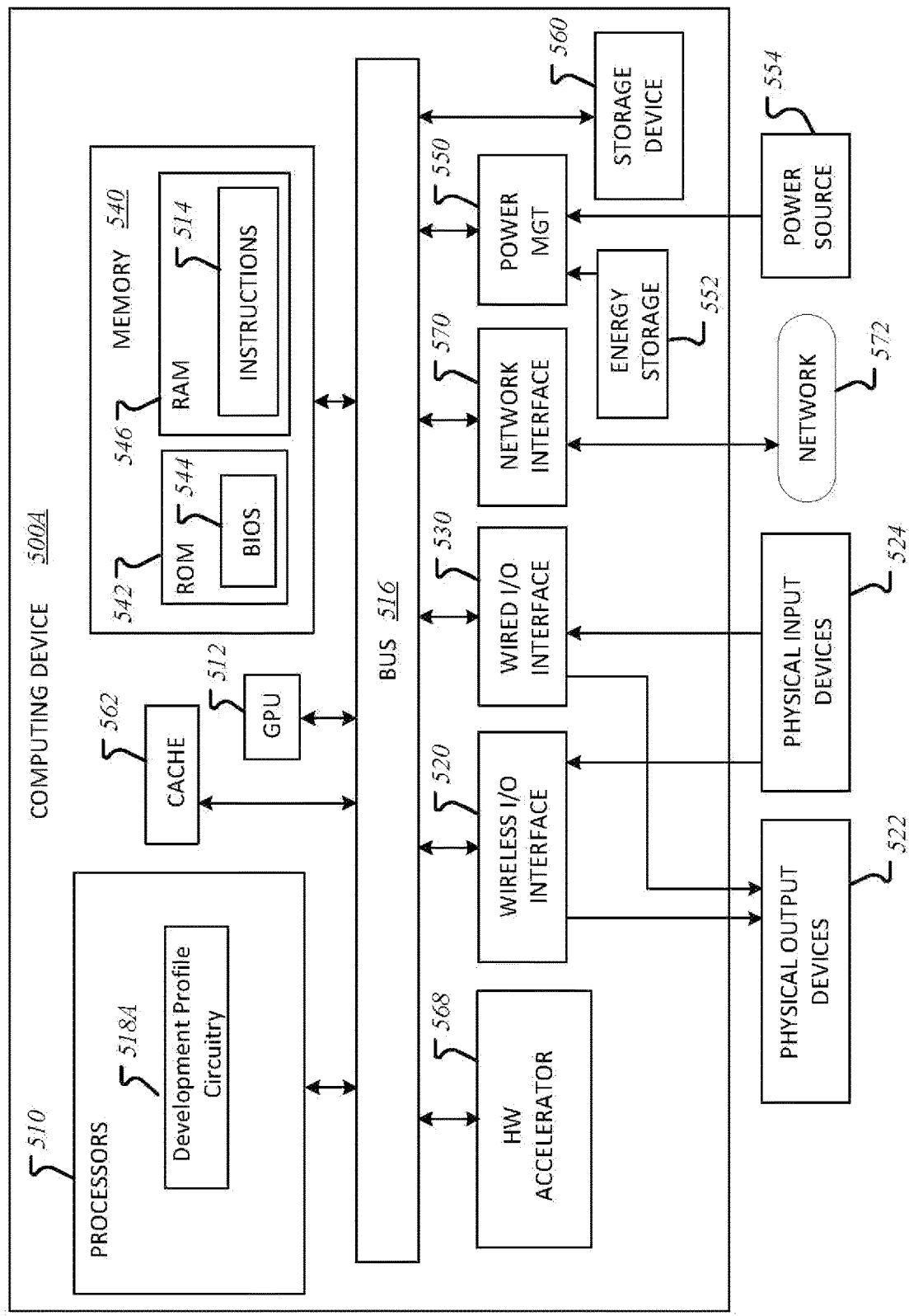
FIG. 5A is a schematic diagram of an illustrative electronic computing device to perform authentication processing according to some embodiments.

FIG. 5A is a schematic diagram of an illustrative electronic computing device to perform authentication processing according to some embodiments. In some embodiments, the computing device 500A represents the source code repository (112, 212) as described relative to FIG. 1 and FIG. 2 herein. In some embodiments, computing device 500A includes one or more processors 510 including development profile circuitry 518A. In some embodiments, the computing device 500A includes one or more hardware accelerators 568.

In some embodiments, the computing device 500A is to implement processing of software-defined performance monitoring events, as provided in FIGS. 1-4 above.

The computing device 500A may additionally include one or more of the following: cache 562, a graphical processing unit (GPU) 512 (which may be the hardware accelerator in some implementations), a wireless input/output (I/O) interface 520, a wired I/O interface 530, system memory 540, power management circuitry 580, non-transitory storage device 560, and a network interface 570 for connection to a network 572. The following discussion provides a brief, general description of the components forming the illustrative computing device 500A. Example, non-limiting computing devices 500A may include a desktop computing device, blade server device, workstation, laptop computer, mobile phone, tablet computer, personal digital assistant, or similar device or system.

In embodiments, the development profile circuitry 518A is capable of executing machine-readable instruction sets 514, reading data and/or machine-readable instruction sets 514 from one or more storage devices 560 and writing data to the one or more storage devices 560. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. For example, machine-readable instruction sets 514 may include instructions to implement authentication processing, as provided in FIGS. 1-4.

The development profile circuitry 518A may include any number of hardwired or configurable circuits, some or all of which may include programmable and/or configurable combinations of electronic components, semiconductor devices, and/or logic elements that are disposed partially or wholly in a PC, server, mobile phone, tablet computer, or other computing system capable of executing processor-readable instructions.

The computing device 500A includes a bus 516 or similar communications link that communicably couples and facilitates the exchange of information and/or data between various system components including the development profile circuitry 518A, the cache 562, the graphics processor circuitry 512, one or more wireless I/O interface 520, one or more wired I/O interfaces 530, one or more storage devices 560, and/or one or more network interfaces 570. The computing device 500A may be referred to in the singular herein, but this is not intended to limit the embodiments to a single computing device 500A, since in certain embodiments, there may be more than one computing device 500A that incorporates, includes, or contains any number of communicably coupled, collocated, or remote networked circuits or devices.

The development profile circuitry 518A may include any number, type, or combination of currently available or future developed devices capable of executing machine-readable instruction sets.

The development profile circuitry 518A may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 5A are of conventional design. Consequently, such blocks need not be described in further detail herein, as they will be understood by those skilled in the relevant art. The bus 516 that interconnects at least some of the components of the computing device 500A may employ any currently available or future developed serial or parallel bus structures or architectures.

The system memory 540 may include read-only memory ("ROM") 542 and random-access memory ("RAM") 546. A portion of the ROM 542 may be used to store or otherwise retain a basic input/output system ("BIOS") 544. The BIOS 544 provides basic functionality to the computing device 500A, for example by causing the development profile circuitry 518A to load and/or execute one or more machine-readable instruction sets 514. In embodiments, at least some of the one or more machine-readable instruction sets 514 cause at least a portion of the development profile circuitry 518A to provide, create, produce, transition, and/or function as a dedicated, specific, and particular machine, for example a word processing machine, a digital image acquisition machine, a media playing machine, a gaming system, a communications device, a smartphone, a neural network, a machine learning model, or similar devices.

The computing device 500A may include at least one wireless input/output (I/O) interface 520. The at least one wireless I/O interface 520 may be communicably coupled to one or more physical output devices 522 (tactile devices, video displays, audio output devices, hardcopy output devices, etc.). The at least one wireless I/O interface 520 may communicably couple to one or more physical input devices 524 (pointing devices, touchscreens, keyboards, tactile devices, etc.). The at least one wireless I/O interface 520 may include any currently available or future developed wireless I/O interface. Example wireless I/O interfaces include, but are not limited to: BLUETOOTH®, near field communication (NFC), and similar.

The computing device 500A may include one or more wired input/output (I/O) interfaces 530. The at least one wired I/O interface 530 may be communicably coupled to one or more physical output devices 522 (tactile devices, video displays, audio output devices, hardcopy output devices, etc.). The at least one wired I/O interface 530 may be communicably coupled to one or more physical input devices 524 (pointing devices, touchscreens, keyboards, tactile devices, etc.). The wired I/O interface 530 may include any currently available or future developed I/O interface. Example wired I/O interfaces include but are not limited to: universal serial bus (USB), IEEE 1394 ("FireWire"), and similar.

The computing device 500A may include one or more communicably coupled, non-transitory, storage devices 560. The storage devices 560 may include one or more hard disk drives (HDDs) and/or one or more solid-state storage devices (SSDs). The one or more storage devices 560 may include any current or future developed storage appliances, network storage devices, and/or systems. Non-limiting examples of such storage devices 560 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more storage devices 560 may include one or more removable storage devices, such as one or more flash drives, flash memories, flash storage units, or similar appliances or devices capable of communicable coupling to and decoupling from the computing device 500A.

The one or more storage devices 560 may include interfaces or controllers (not shown) communicatively coupling the respective storage device or system to the bus 516. The one or more storage devices 560 may store, retain, or otherwise contain machine-readable instruction sets, data structures, program modules, data stores, databases, logical structures, and/or other data useful to the development profile circuitry 518A and/or graphics processor circuitry 512 and/or one or more applications executed on or by the development profile circuitry 518A and/or graphics processor circuitry 512. In some instances, one or more data storage devices 560 may be communicably coupled to the development profile circuitry 518A, for example via the bus 516 or via one or more wired communications interfaces 530 (e.g., Universal Serial Bus or USB); one or more wireless communications interface 520 (e.g., Bluetooth®, Near Field Communication or NFC); and/or one or more network interfaces 570 (IEEE 802.3 or Ethernet, IEEE 802.11, or Wi-Fi®, etc.).

Machine-readable instruction sets 514 and other programs, applications, logic sets, and/or modules may be stored in whole or in part in the system memory 540. Such machine-readable instruction sets 514 may be transferred, in whole or in part, from the one or more storage devices 560. The machine-readable instruction sets 514 may be loaded, stored, or otherwise retained in system memory 540, in whole or in part, during execution by the development profile circuitry 518A and/or graphics processor circuitry 512.

The computing device 500A may include power management circuitry 580 that controls one or more operational aspects of the energy storage device 582. In embodiments, the energy storage device 582 may include one or more primary (i.e., non-rechargeable) or secondary (i.e., rechargeable) batteries or similar energy storage devices. In embodiments, the energy storage device 582 may include one or more supercapacitors or ultracapacitors. In embodiments, the power management circuitry 580 may alter, adjust, or control the flow of energy from an external power source 584 to the energy storage device 582 and/or to the computing device 500A. The external power source 584 may include, but is not limited to, a solar power system, a commercial electric grid, a portable generator, an external energy storage device, or any combination thereof.

For convenience, the development profile circuitry 518A, the graphics processor circuitry 512, the wireless I/O interface 520, the wired I/O interface 530, the storage device 560, and the network interface 570 are illustrated as communicatively coupled to each other via the bus 516, thereby providing connectivity between the above-described components. In alternative embodiments, the above-described components may be communicatively coupled in a different manner than illustrated in FIG. 5A. For example, one or more of the above-described components may be directly coupled to other components, or may be coupled to each other, via one or more intermediary components (not shown). In another example, one or more of the above-described components may be integrated into the development profile circuitry 518A and/or the graphics processor circuitry 512. In some embodiments, all or a portion of the bus 516 may be omitted and the components are coupled directly to each other using suitable wired or wireless connections.

Flow charts representative of example hardware logic, machine readable instructions, hardware implemented state machines, and/or any combination thereof for implementing computing device 500A, for example, are shown in FIGS. 3-4. The machine-readable instructions may be one or more executable programs or portion(s) of an executable program for execution by a computer processor such as the processor 510 shown in the example computing device 500A discussed above in connection with FIG. 5A. The program may be embodied in software stored on a non-transitory computer readable storage medium such as a CD-ROM, a floppy disk, a hard drive, a DVD, a Blu-ray disk, or a memory associated with the processor 510, but the entire program and/or parts thereof could alternatively be executed by a device other than the processor 510 and/or embodied in firmware or dedicated hardware. Further, although the example program is described with reference to the flow charts illustrated in FIGS. 3-4, many other methods of implementing the example computing device 500A may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3-4 may be implemented using executable instructions (e.g., computer and/or machine-readable instructions) stored on a non-transitory computer and/or machine-readable medium such as a hard disk drive, a solid-state storage device (SSD), a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

Figure 5B:
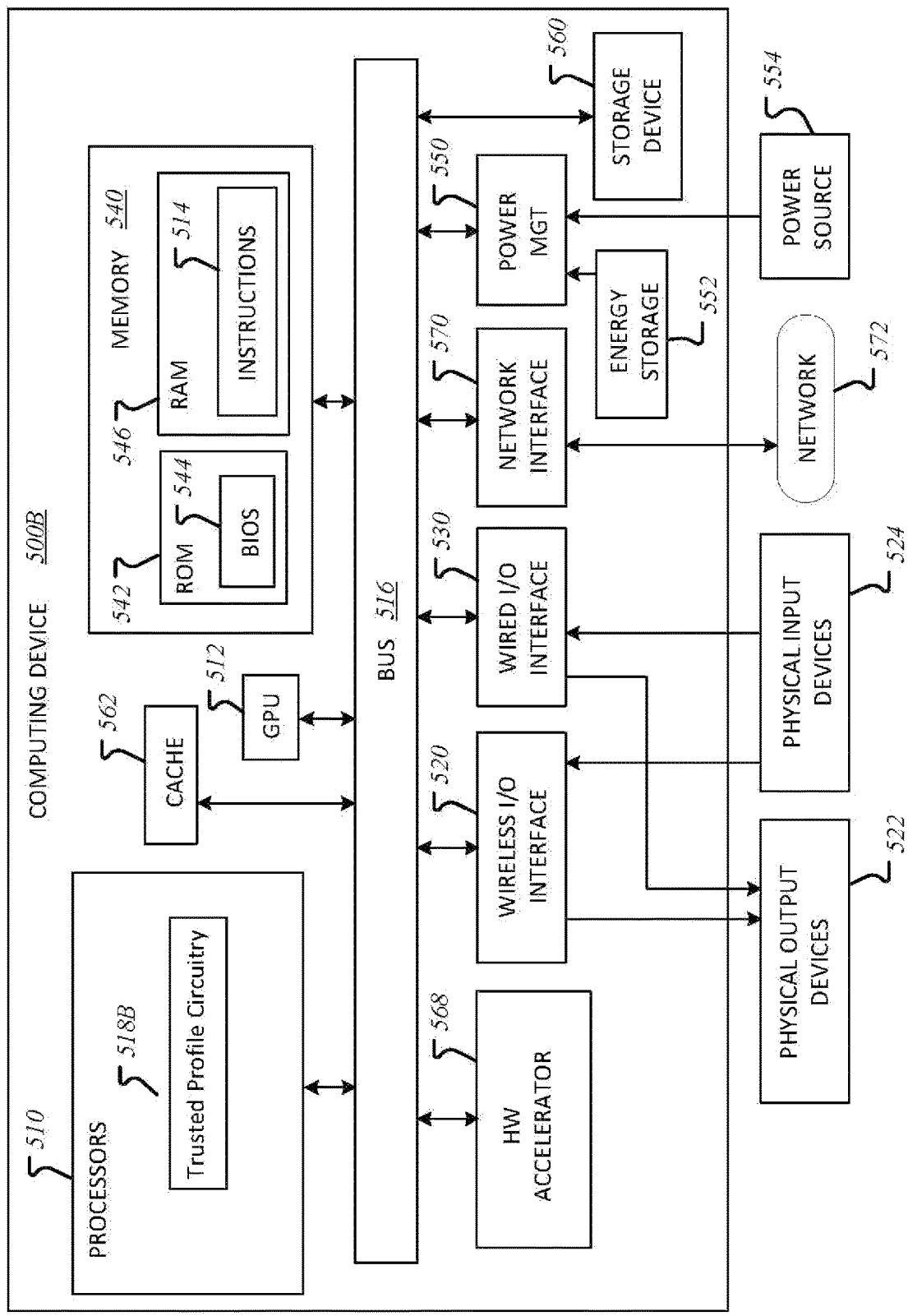
FIG. 5B is a schematic diagram of an illustrative electronic computing device to perform authentication processing according to some embodiments.

FIG. 5B is a schematic diagram of an illustrative electronic computing device to perform authentication processing according to some embodiments. In some embodiments, the computing device 500B represents the trusted profile verifier (114, 214) as described relative to FIG. 1 and FIG. 2 herein. In some embodiments, computing device 500B includes one or more processors 510 including trusted profile circuitry 518B.

In some embodiments, the computing device 500B is to implement processing of software-defined performance monitoring events, as provided in FIGS. 1-4 above. The computing device 500B may additionally include the components forming the illustrative computing device 500A described herein relative to FIG. 5A such as one or more of the following: cache 562, a graphical processing unit (GPU) 512 (which may be the hardware accelerator in some implementations), a wireless input/output (I/O) interface 520, a wired I/O interface 530, system memory 540, power management circuitry 580, non-transitory storage device 560, a network interface 570 for connection to a network 572, machine-readable instructions sets 514, one or more storage devices 560, and the like. In this regard, the computing device 500B may include any or all of the non-limiting examples of computing device 500A described relative to FIG. 5A. Additionally, the computing device 500B may perform, execute and/or implement processing of any or all of the functions, methods, processes performed, executed and/or implemented by computing device 500A described relative to FIG. 5A.

Furthermore, the trusted profile circuitry 518B is capable of executing machine-readable instruction sets 514, reading data and/or machine-readable instruction sets 514 from one or more storage devices 560 and writing data to the one or more storage devices 560. In this regard, the trusted profile circuitry 518B may include any or all the functionality of the development profile circuitry 518A described relative to FIG. 5A The following examples pertain to further embodiments. Example 1 is a method including receiving, by one or more processors associated with a source code repository, a development profile from a development environment; sending the development profile to a trusted profile verifier to be registered as a trusted development profile; receiving a pending source file commit request, where the pending source file commit request includes source code files and a current development profile; facilitating verification of whether the current development profile matches the trusted development profile; and when it is verified that the current development profile matches the trusted development profile, accepting the source code files.

In Example 2, the subject matter of Example 1 can optionally include wherein the development profile includes at least a hardware profile, a software profile, and an environment profile.

In Example 3, the subject matter of Example 2 can optionally include wherein the hardware profile includes authenticated hardware measurements of the development environment.

In Example 4, the subject matter of Example 2 can optionally include wherein the software profile includes authenticated software measurements of the development environment.

In Example 5, the subject matter of Example 2 can optionally include the environment profile includes environmental characteristics of the development environment, where the environmental characteristics include one or more of keyboard usage statistics, mouse usage statistics, camera video frames, lighting conditions, geolocation data, surrounding sounds and noise levels.

In Example 6, the subject matter of Example 1 can optionally include wherein facilitating verification of whether the current development profile matches the trusted development profile comprises: sending the current development profile to the trusted profile verifier where data from the current development profile is compared to data from the trusted development profile; and receiving an authentication response from the trusted profile verifier.

In Example 7, the subject matter of Example 6 can optionally include wherein at least some of the data from the current development profile is compared to at least some of the data from the trusted development profile by implementing machine learning techniques.

In Example 8, the subject matter of Example 1 can optionally include wherein the development profile is registered as the trusted development profile by verifying an authenticity of hardware and software attestation evidence.

In Example 9, the subject matter of Example 1 can optionally include further comprising when it is verified that the current development profile does not match the trusted development profile, rejecting the source code files.

Example 10 is at least one non-transitory machine-readable storage medium comprising instructions that, when executed, cause at least one processing device to at least:

receive a development profile from a development environment; send the development profile to a trusted profile verifier to be registered as a trusted development profile; receive a pending source file commit request, where the pending source file commit request includes source code files and a current development profile; facilitate verification of whether the current development profile matches the trusted development profile; and when it is verified that the current development profile matches the trusted development profile, accept the source code files.

In Example 11, the subject matter of Example 10 can optionally include wherein the development profile includes at least a hardware profile, a software profile, and an environment profile.

In Example 12, the subject matter of Example 11 can optionally include wherein the hardware profile includes authenticated hardware measurements of the development environment.

In Example 13, the subject matter of Example 11 can optionally include wherein the software profile includes authenticated software measurements of the development environment.

In Example 14, the subject matter of Example 11 can optionally include wherein the environment profile includes environmental characteristics of the development environment, where the environmental characteristics include one or more of keyboard usage statistics, mouse usage statistics, camera video frames, lighting conditions, geolocation data, surrounding sounds and noise levels.

Example 15 is an apparatus comprising one or more processors to: receive a development profile from a development environment; send the development profile to a trusted profile verifier to be registered as a trusted development profile; receive a pending source file commit request, where the pending source file commit request includes source code files and a current development profile; facilitate verification of whether the current development profile matches the trusted development profile; and when it is verified that the current development profile matches the trusted development profile, accept the source code files.

In Example 16, the subject matter of Example 15 can optionally include wherein the development profile includes at least a hardware profile, a software profile, and an environment profile.

In Example 17, the subject matter of Example 16 can optionally include wherein the hardware profile includes authenticated hardware measurements of the development environment.

In Example 18, the subject matter of Example 16 can optionally include wherein the software profile includes authenticated software measurements of the development environment.

In Example 19, the subject matter of Example 16 can optionally include wherein the environment profile includes environmental characteristics of the development environment, where the environmental characteristics include one or more of keyboard usage statistics, mouse usage statistics, camera video frames, lighting conditions, geolocation data, surrounding sounds and noise levels.

In Example 20, the subject matter of Example 15 can optionally include wherein to facilitate verification of whether the current development profile matches the trusted development profile, the memory having instructions stored thereon that, in response to execution by the processor, further cause the processor to: send the current development profile to the trusted profile verifier where data from the current development profile is compared to data from the trusted development profile; and receive an authentication response from the trusted profile verifier.

Example 21 is a system including one or more processors coupled to a memory, wherein the one or more processors are operative to perform the method of any one of Examples 1 to 9.

Example 22 is a method including registering, by one or more processors associated with a trusted profile verifier, a development profile as a trusted development profile; receiving a current development profile; comparing data from the current development profile to data from the trusted development profile; and sending an authentication response to a source code repository.

In Example 23, the subject matter of Example 22 can optionally include wherein registering, by the one or more processors associated with the trusted profile verifier, the development profile as the trusted development profile comprises checking that hardware attestation evidence and software attestation evidence included in the development profile is trustworthy.

In Example 24, the subject matter of Example 23 can optionally include wherein checking that hardware attestation evidence and software attestation evidence included in the development profile is trustworthy comprises verifying that hardware attestation evidence and software attestation evidence came from a development platform that has not been revoked.

In Example 25, the subject matter of Example 22 can optionally include wherein the data from the current development profile and the trusted development profile includes at least hardware and software attestation measurements, and wherein comparing data from the current development profile to data from the trusted development profile comprises comparing the hardware and software attestation measurements in the current development profile with the hardware and software attestation measurements in the trusted development profile to determine whether there is a match In Example 26, the subject matter of Example 22 can optionally include wherein the data from the current development profile and the trusted development profile includes at least environmental characteristics, and wherein comparing data from the current development profile to data from the trusted development profile comprises comparing the environmental characteristics in the current development profile with the environmental characteristics in the trusted development profile.

In Example 27, the subject matter of Example 26 can optionally include wherein comparing the environmental characteristics in the current development profile with the environmental characteristics in the trusted development profile comprises implementing pattern matching using at least one of artificial intelligence techniques and machine learning algorithms.

In Example 28, the subject matter of Example 22 can optionally include wherein the authentication response indicates whether the current development profile is trustworthy.

Example 29 is a system including one or more processors coupled to a memory, wherein the one or more processors are operative to perform the method of any one of Examples 22 to 28.

Example 30 is an apparatus comprising one or more processors to perform the method of any one of Examples 22 to 28.

Example 31 is at least one non-transitory machine-readable storage medium comprising instructions that, when executed, cause at least one processing device to perform the method of any one of Examples 22 to 28.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. A method comprising:
receiving, by processing circuitry associated with a source code repository, a development profile from a remote development environment;
sending, by the processing circuitry associated with the source code repository, the development profile to a trusted profile verifier to be registered as a trusted development profile;
receiving, from the remote development environment, a pending source file commit request, where the pending source file commit request includes source code files and a current development profile;
facilitating verification of whether the current development profile matches the trusted development profile, wherein the development profile includes one or more of a hardware profile, a software profile, or an environment profile; and
upon verifying the current development profile matches the trusted development profile, accepting the source code files.

2. The method of claim 1, wherein the hardware profile includes authenticated hardware measurements of the remote development environment.

3. The method of claim 1, wherein the software profile includes authenticated software measurements of the remote development environment.

4. The method of claim 1, wherein the environment profile includes environmental characteristics of the remote development environment, where the environmental characteristics include one or more of keyboard usage statistics, mouse usage statistics, camera video frames, lighting conditions, geolocation data, or surrounding sounds and noise levels.

5. The method of claim 1, wherein facilitating verification of whether the current development profile matches the trusted development profile comprises:
sending the current development profile to the trusted profile verifier where data from the current development profile is compared to data from the trusted development profile; and
receiving an authentication response from the trusted profile verifier.

6. The method of claim 5, wherein at least some of the data from the current development profile is compared to at least some of the data from the trusted development profile by implementing machine learning techniques.

7. The method of claim 1, wherein the development profile is registered as the trusted development profile by verifying an authenticity of hardware and software attestation evidence.

8. The method of claim 1, further comprising when it is verified that the current development profile does not match the trusted development profile, rejecting the source code files.

9. At least one non-transitory machine-readable storage medium comprising instructions which, when executed, cause processing circuitry of a computing device to perform operations comprising:
receiving a development profile from a remote development environment;
sending the development profile to a trusted profile verifier to be registered as a trusted development profile;
receiving, from the remote development environment, a pending source file commit request, where the pending source file commit request includes source code files and a current development profile;
facilitating verification of whether the current development profile matches the trusted development profile, wherein the development profile includes one or more of a hardware profile, a software profile, or an environment profile; and
upon verifying the current development profile matches the trusted development profile, accepting the source code files.

10. The non-transitory machine-readable storage medium of claim 9, wherein the hardware profile includes authenticated hardware measurements of the remote development environment.

11. The non-transitory machine-readable storage medium of claim 9, wherein the software profile includes authenticated software measurements of the remote development environment.

12. The non-transitory machine-readable storage medium of claim 9, wherein the environment profile includes environmental characteristics of the remote development environment, where the environmental characteristics include one or more of keyboard usage statistics, mouse usage statistics, camera video frames, lighting conditions, geolocation data, or surrounding sounds and noise levels.

13. An apparatus comprising:
processing circuitry comprising development profile circuitry to:
receive a development profile from a remote development environment;
send the development profile to a trusted profile verifier to be registered as a trusted development profile;
receive, from the remote development environment, a pending source file commit request, where the pending source file commit request includes source code files and a current development profile;
facilitate verification of whether the current development profile matches the trusted development profile, wherein the development profile includes one or more of a hardware profile, a software profile, or an environment profile; and
when it is verified that the current development profile matches the trusted development profile, accept the source code files.

14. The apparatus of claim 13, wherein the hardware profile includes authenticated hardware measurements of the remote development environment.

15. The apparatus of claim 13, wherein the software profile includes authenticated software measurements of the remote development environment.

16. The apparatus of claim 13, wherein the environment profile includes environmental characteristics of the development environment, where the environmental characteristics include one or more of keyboard usage statistics, mouse usage statistics, camera video frames, lighting conditions, geolocation data, or surrounding sounds and noise levels.

17. The apparatus of claim 13, wherein to facilitate verification of whether the current development profile matches the trusted development profile, further cause the processing circuitry comprising development profile circuitry to:

send the current development profile to the trusted profile verifier where data from the current development profile is compared to data from the trusted development profile; and receive an authentication response from the trusted profile verifier.

\* \* \* \* \*